United States Patent [19]
Good et al.

[11] Patent Number: 5,998,537
[45] Date of Patent: Dec. 7, 1999

[54] EMULSIONS CONTAINING ULTRAHIGH VISCOSITY SILICONE POLYMERS

[75] Inventors: Kristin Elizabeth Good; Jeffrey Alan Kosal, both of Midland, Mich.

[73] Assignee: Dow Corning Corporation, Midland, Mich.

[21] Appl. No.: 09/157,688

[22] Filed: Sep. 21, 1998

[51] Int. Cl.$^6$ ..................... C08L 83/00
[52] U.S. Cl. ............................ 524/588
[58] Field of Search ............................ 524/588

[56] References Cited

U.S. PATENT DOCUMENTS

| | | | |
|---|---|---|---|
| 4,122,247 | 10/1978 | Evans | 528/14 |
| 4,157,337 | 6/1979 | Evans | 260/448.2 |
| 4,272,624 | 6/1981 | Razzano | 528/37 |
| 4,341,888 | 7/1982 | Razzano | 528/14 |
| 4,814,376 | 3/1989 | Tanaka | 524/588 |
| 5,002,762 | 3/1991 | Bolich | 424/70 |
| 5,661,215 | 8/1997 | Gee | 524/837 |
| 5,684,085 | 11/1997 | Gee | 524/837 |

*Primary Examiner*—Paul R. Michl
*Attorney, Agent, or Firm*—Jim L. DeCesare

[57] ABSTRACT

Emulsions containing particles of an organopolysiloxane with an average particle diameter of less than about 100 nanometer are prepared by (i) adding a polyfunctional silane to an aqueous medium containing a nonionic surfactant, an anionic or cationic surfactant, and a catalyst; (ii) allowing the polyfunctional silane to hydrolyze; (iii) adding a cyclic siloxane to the aqueous medium containing the pre-hydrolyzed polyfunctional silane; (iv) copolymerizing the cyclic siloxane and the pre-hydrolyzed polyfunctional silane to form the organopolysiloxane; and (v) continuing copolymerizing step (iv) until the resulting organopolysiloxane has a viscosity greater than about 100,000,000 centipoise (mPa·s).

6 Claims, No Drawings

EMULSIONS CONTAINING ULTRAHIGH VISCOSITY SILICONE POLYMERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to emulsion polymerization, and to methods of making emulsions, more particularly ionic emulsions. These emulsions contain silicone polymer particles preferably of a diameter less than about 100 nanometer.

The silicone polymer constitutes the internal phase of the emulsion, and is present as an ultrahigh viscosity polymer with a viscosity in excess of about 100,000,000 centipoise (mPa·s). It possesses unique rheological properties, such as a dissipation factor or tan δ (G"/G') of about 0.5.

BACKGROUND OF THE INVENTION

While U.S. Pat. No. 5,661,215 (Aug. 26, 1997) and U.S. Pat. No. 5,684,085 (Nov. 4, 1997), hereafter referred to as the '215 and '085 patents, teach a method of preparing emulsions of organopolysiloxanes by copolymerizing a cyclic siloxane and a polyfunctional silane in an aqueous medium containing a nonionic surfactant, an anionic or cationic surfactant, and a catalyst; the method according to the '215 and '085 patents is limited to emulsions containing an organopolysiloxane with a viscosity of, at most, about 5,000,000 centipoise (mPa·s). In contrast, the method of the present invention is capable of producing similar types of emulsions, but emulsions which contain an organopolysiloxane with a viscosity in excess of about 100,000,000 centipoise (mPa·s). This twenty-fold increase in the polymer viscosity is enabled and attributed to a unique modification in the order of addition of the components, not taught or suggested by the '215 and '085 patents.

BRIEF SUMMARY OF THE INVENTION

Thus, the invention relates to an emulsion polymerization process in which the novel feature resides in the addition of a polyfunctional silane to an aqueous surfactant blend, prior to the addition of a cyclic siloxane. As a result, processes according to this invention produce silicone polymers having a much higher viscosity value when measured under low shear conditions. The silicone polymers also possess unique rheological properties characterized by their elastic modulus G' and their viscous modulus G". These benefits and unique characteristics are not attainable using the techniques exemplified by the '215 and '085 patents, in which the polyfunctional silane is incorporated along with the cyclic siloxane.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

There exists a need for emulsions capable of functioning as a means of delivering polymers of high molecular weight and tailored rheological properties to the human body, i.e., as in a shampoo base to provide styling and conditioning benefits to human hair.

There also exist needs in paper coating, textile coating, and home care applications, for emulsions with a particle size of less than about 100 nm, capable of delivering high molecular weight polymers with non-transferable tack properties to various types of surfaces and substrates.

In seeking to meet these needs, the inventors herein noted that prior art techniques exemplified by the '215 and '085 patents were limited, such that even with changes in their process, i.e., the addition of a small amount of a polyfunctional silane such as an alkoxy silane to a cyclic siloxane, that the highest achievable polymer viscosity was only about 83,000,000 centipoise (mPa·s).

Unexpectedly, however, it was discovered that when the polyfunctional silane, i.e., the alkoxy silane, was added to a catalyzed surfactant/water solution, instead of being added with the cyclic siloxane, and allowed to hydrolyze, followed by addition of the cyclic siloxane, that the new technique resulted in emulsions containing internal polymers with a viscosity ranging from about 100,000,000 to about 800,000,000 or more centipoise (mPa·s).

Accordingly, this invention is directed to a new method of making emulsions exhibiting an ultra-high polymer viscosity and unique rheological properties.

Emulsions according to this invention are made from a siloxane oligomer, a polyfunctional silane such as an hydrolyzable water-soluble alkoxysilane, either a cationic or anionic surfactant, a nonionic surfactant, a catalyst, and water. Equivalent results can be achieved by using certain types of anionic surfactants which can also act as a catalyst, thereby eliminating the need for a separate catalyst. Similarly, certain types of cationic surfactants have nonionic characteristics, thereby eliminating the need for a separate nonionic surfactant.

Polymerization according to the method of this invention involves the opening of a cyclic siloxane ring using an acid or base catalyst in the presence of water. Upon opening of the ring, polysiloxane oligomers with terminal hydroxy groups are formed. These polysiloxane oligomers then react with each other or with other silicon atom containing reactants in the reaction medium, through a condensation reaction to form polysiloxane polymers or copolymers.

The siloxane oligomers are cyclic siloxanes of the formula $(R_2SiO)_x$ where each R is a saturated or unsaturated alkyl group of 1–6 carbon atoms, an aryl group of 6–10 carbon atoms, and x is 3–7. R can optionally contain a functional group which is unreactive in the ring opening and polymerization reaction.

Suitable R groups are methyl, ethyl, propyl, phenyl, allyl, vinyl, and $-R^1F$. $R^1$ is an alkylene group of 1–6 carbon atoms or an arylene group of 6–10 carbon atoms, and F is a functional group such as amine, diamine, halogen, carboxy, or mercapto. R can also be $-R^1F^1R$ where $R^1$ and R are described above and $F^1$ is a non-carbon atom such as oxygen, nitrogen, or sulfur.

Cyclic siloxanes useful in this invention include oligomers such as hexamethylcyclotrisiloxane ($D_3$), octamethylcyclotetrasiloxane ($D_4$), decamethylcyclopentasiloxane ($D_5$), tetramethyltetravinylcyclotetrasiloxane, tetramethyltetraphenylcyclotetrasiloxane, and mixtures thereof.

The polyfunctional silane is an hydrolyzable water-soluble alkoxysilane corresponding to one of the formulas $RSi(OR')_3$ or $(R'O)_4Si$ where R is an organic group, preferably containing 1–12 carbon atoms, such as an unsubstituted alkyl group $C_nH_{2n+1}$, or an aryl group. R' in hydrolyzable group —(OR') is an alkyl group containing 1–6 carbon atoms. Most preferred silanes $RSi(OR')_3$ are alkoxysilanes with neutral organic groups R.

Tetraalkoxysilanes $(R'O)_4Si$ are best exemplified by tetramethoxysilane, tetraethoxysilane, tetrapropoxysilane, and tetrabutoxysilane.

Hydrolyzable water-soluble or partially pre-hydrolyzed alkoxysilanes $RSi(OR')_3$ with neutral organic groups R can be used and are exemplified by methyltrimethoxysilane (MTM), ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, and phenyltrimethoxysilane. If desired, alcohols generated by hydrolysis of the alkoxysilanes may be removed.

Hydrolyzable water-soluble alkoxysilanes $RSi(OR')_3$ with cationic organofunctional groups R are exemplified by amino functional silanes which are also included in this invention.

The emulsions contain a silicone concentration of 10–70% by weight of the total emulsion solution, preferably 25–60%. While emulsions with less than 10% silicone content can be made, such emulsions hold little or no economic value.

The reaction to polymerize the silicon atom containing reactants and form emulsions is carried out in a reactor containing a reaction medium of water, at least one cationic or anionic (ionic) surfactant, at least one nonionic surfactant, and a catalyst.

Any catalyst capable of polymerizing cyclic siloxanes in the presence of water is useful in the method. Catalysts include condensation polymerization catalysts capable of cleaving siloxane bonds, exemplified by strong acids such as substituted benzene sulfonic acids, aliphatic sulfonic acids, hydrochloric acid, and sulfuric acid; and strong bases such as quaternary ammonium hydroxides and metal hydroxides. Some anionic surfactants such as dodecylbenzene sulfonic acid can function as an acid catalyst, in addition to their function as surfactants. Other useful catalytic systems include phase transfer catalysts such as tetrabutyl ammonium hydroxide or ion exchange resins where a catalyst is formed in situ.

The catalyst is present in the reaction medium at levels of 0.01–30% by weight of total silicone. Strong acids and basic metal hydroxides can be used within the lower end of this range, while surfactants which also function as catalyst will be present at concentrations on the higher end of the range.

It is preferred that the reaction medium contain both an ionic and nonionic surfactant to stabilize the polysiloxane in the emulsion. The ionic surfactants can be anionic or cationic surfactants known in the art as being useful in emulsion polymerization.

Suitable anionic surfactants include but are not limited to sulfonic acids and their salt derivatives. Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms.

Commercial anionic surfactants useful in this invention include dodecylbenzene sulfonic acid sold under the tradename BIOSOFT S-100 by Stepan Company, Northfield, Ill.; the sodium salt of dodecylbenzene sulfonic acid sold under the tradename SIPONATE DS-10 by Alcolac Inc., Baltimore, Md.; and sodium n-hexadecyl diphenyloxide disulfonate sold under the tradename DOWFAX 8390 by The Dow Chemical Company, Midland, Mich.

Useful cationic surfactants are the fatty acid amines, amides, and derivatives, and salts of fatty acid amines and amides. Cationic surfactants can be exemplified by aliphatic fatty amines and derivatives such as dodecyl amine acetate, octadecyl amine acetate, and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow trimethylammonium chloride, dioctadecyldimethyl ammonium chloride, didodecyldimethyl ammonium chloride, and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid, and octadecylchloromethyl ether; urethanes of ethylene diamine such as condensation products of stearic acid and diethylene triamine; polyethylene diamines; and polypropanol polyethanol amines.

Commercial cationic surfactants include products sold under the tradenames ARQUAD T-27W, 16–29, C-33, T-50; and ETHOQUAD T/13 and T/13 ACETATE; by Akzo Chemicals Inc., Chicago, Ill.

The anionic or cationic surfactant is present at 0.05–30% by weight of total emulsion, preferably 0.5–20%.

Useful nonionic surfactants preferably have a hydrophilic-lipophilic balance (HLB) of 10–20. Nonionic surfactants with HLB of less than 10 may be used, but hazy solutions may result due to limited solubility of the nonionic surfactant in water. When using a nonionic surfactant with HLB less than 10, a nonionic surfactant with HLB greater than 10 should be added during or after polymerization.

Commercial types of nonionic surfactants can be exemplified by 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn.

Other types of commercial nonionic surfactants are nonylphenoxy polyethoxy ethanol (10EO) sold under the tradename MAKON 10 by Stepan Company, Northfield, Ill. One especially useful nonionic surfactant is polyoxyethylene 23 lauryl ether (Laureth-23) sold commercially under the tradename BRIJ 35 L by ICI Surfactants, Wilmington, Del.

The level of nonionic surfactant should be 0.1–40% by weight based on total weight of emulsion, preferably 0.5–30%.

Some commercially available ionic surfactants have characteristics of both ionic and nonionic surfactants combined, and this type of surfactant is useful in the invention. One example of such a surfactant such as methyl polyoxyethylene (15) octadecyl ammonium chloride sold under the tradename ETHOQUAD 18/25 by Akzo Chemicals Inc., Chicago, Ill. The material is a cationic quaternary ammonium salt with polyethylene oxide tails. When this type of surfactant is used, it is not necessary to have both ionic and nonionic surfactants in the reaction medium. Only the ionic surfactant having the nonionic characteristics is needed. If the ionic surfactant does not have characteristics of both ionic and nonionic surfactants, it is preferred to use both types of surfactants in the method of this invention. Surfactants such as ETHOQUAD 18/25 are typically used in the emulsion at levels equal to the level of the ionic surfactants used.

The method is carried out by creating a mixture containing the cyclic siloxane, hydrolyzable water-soluble alkoxysilane, ionic (cationic or anionic) surfactant, nonionic surfactant, water, and catalyst. The mixture is heated with agitation at a polymerization reaction temperature until essentially all of the cyclic siloxane and silane are reacted, and a stable, oil-free emulsion of polymer is formed. The time required for formation of the stable, oil-free emulsion will vary depending on the reactants and the reaction conditions.

The mixture of cyclic siloxane, silane, ionic surfactant, nonionic surfactant, water, and catalyst is not stable, and will separate without some means of agitation. It is not necessary to have all of the cyclic siloxane and silane fully dispersed into the mixture during the reaction, however some means of agitation should be provided throughout the course of the reaction.

Combining the cyclic siloxane, silane, ionic surfactant, nonionic surfactant, water, and catalyst, and then reacting the cyclic siloxane and silane to form the emulsion, takes place by combining all of the ingredients with agitation, except for the cyclic siloxane and silane, heating to the desired polymerization temperature, adding or feeding in the silane without the cyclic siloxane, heating and agitating at the desired polymerization temperature thereby allowing the silane to hydrolyze, adding or feeding in the cyclic siloxane, and thereafter heating and agitating at the desired polymerization temperature, thereby allowing the cyclic siloxane and silane to react and form an emulsion.

Thus, ingredients are combined in a given order, agitated during and following their addition, and heated to the polymerization temperature when all of them have been combined.

Polymerization reaction temperatures are typically above the freezing point, but below the boiling point of water. Pressures above or below atmospheric pressure allow operation outside of this range. At lower temperatures below room temperature, the polymerization reaction may proceed more slowly. The preferred temperature range is 50–95° C.

The polymerization reaction can be stopped at the desired level of conversion of cyclic siloxane/silane and/or particle size by using known methods. It is preferred to stop the reaction when the largest amount of cyclic siloxane and silane have been reacted or when ring/chain equilibrium for the system and the desired particle size have been obtained. Reaction times of less than 24 hours, typically less than 5 hours, are sufficient to achieve the desired particle size and/or level of conversion.

The methods for stopping the reaction encompass neutralization of the catalyst by addition of equal or slightly greater stoichiometric amounts of acid or base depending upon the type of catalyst. Either a strong or weak acid/base may be used to neutralize the reaction. Care must be taken when using a strong acid/base not to over neutralize, as it is possible to re-catalyze the reaction. It is preferred to neutralize with sufficient quantities of acid or base such that the resulting emulsion has a pH of less than 7 when a cationic surfactant is present, and a pH of greater than 7 when an anionic surfactant is present.

Some examples of neutralizing agents which may be employed include sodium hydroxide, ammonium hydroxide, potassium hydroxide, hydrochloric acid, sulfuric acid, acetic acid, triethanolamine (TEA), triethylamine, and isopropyl amine.

If desired, a small quantity of alcohol can be added to the reaction medium before or after catalysis to increase the particle size of the emulsion. Alcohols useful in the method include methanol, ethanol and isopropanol. Since alcohols are typically used to break emulsions, it is preferred to keep the concentration of the alcohol at low levels, preferably below 5% by weight. To have the greatest effect on particle size, it is preferred to have the alcohol present throughout the course of the polymerization reaction.

Since emulsions are susceptible to microbiological contamination, a preservative may also be required, and representative compounds which may be employed include formaldehyde, DMDM hydantoin, 5-bromo-5-nitro-1,3-dioxane, methyl paraben, propyl paraben, sorbic acid, imidazolidinyl urea, and 5-chloro-2-methyl-4-isothiazolin-3-one which is a product sold under the tradename KATHON CG by the Rohm & Haas Company, Philadelphia, Pa.

EXAMPLES

The following examples are set forth to illustrate the invention in more detail. In the examples, "DI Water" represents deionized water; Brij 35 L is a nonionic surfactant; Biosoft S-100 is an anionic surfactant; $D_4$ represents the cyclic siloxane octamethylcyclotetrasiloxane; MTM represents methyltrimethoxysilane; TEA represents a water solution containing 85 percent triethanolamine used as the neutralizing agent; and Kathon CG is the preservative. The anionic surfactant Biosoft S-100 used in the examples, i.e., dodecylbenzene sulfonic acid, additionally functions as an acid catalyst.

The following test methods were used to analyze emulsions prepared according to Examples 1–5.

Emulsion Break Procedure—Polymer Extraction

To break the emulsion and harvest the polymer for testing, 10 g of emulsion was placed in a plastic centrifuge tube. 30 mL of isopropanol was added and the mixture was centrifuged for 8 minutes to break the emulsion. Isopropanol was removed from the centrifuge, and 30 mL of acetone was added to wash the polymer. The acetone-polymer mixture was centrifuged for 8 minutes, then the acetone was decanted. The polymer was removed from the tube and placed in an aluminum weighing dish. It was dried in an 105° C. oven for 30 minutes.

Rheology—Flow Procedure

This procedure used a Carrimed Controlled Stress Cone and Plate Rheometer made by Carrimed Ltd., Interpret House, Curtis Road Industrial Estate, Dorking, Surry RH 4 1DP, England. The rheometer was equipped with DOS software for flow experiments. A pre-shear stress of 10,000 dynes/cm$^2$ was applied for one minute, and the sample was allowed to equilibrate for four minutes. The sample was then subjected to stress in log mode from 10 dynes/cm2 to 10000 dyne/cm2, with seven steps of 3 minutes at each step. All experiments were conducted at 25° C.

Rheology—Oscillation Procedure

This procedure also used a Carrimed Controlled Stress Cone and Plate Rheometer, but it was equipped with Windows™ software for oscillation experiments. A pre-experiment step was performed, equilibrating the sample at 25° C. for 5 minutes. Next, an amplitude ramp was performed at an angular frequency of 1.659 rad/sec. The ramp was linear with a beginning amplitude of $5000^{e-4}$ radians and an ending amplitude of 0.0100 radians. All experiments were conducted at 25° C.

Example 1
Emulsion Procedure—Comparative Example

The following formulation was used to make an 1800 gram batch of an emulsion using processing conditions generally representative of the prior art, i.e., the '215 and '085 patents, by dispensing the silane MTM into a small amount of cyclic siloxane, then feeding the mixture into the reactor over a period of 15 minutes.

| Material | Percent | Weight (gram) |
| --- | --- | --- |
| DI Water | 42.89 | 772.02 |
| Brij 35L | 0.80 | 14.40 |
| Biosoft S-100 | 7.98 | 143.64 |
| D$_4$ | 23.91 | 429.12 |
| D$_4$ | 1.05 | 18.90 |
| MTM | 0.07 | 1.26 |
| Brij 35L | 3.46 | 62.28 |
| TEA | 4.87 | 87.66 |
| DI Water | 14.86 | 267.48 |
| Kathon CG | 0.10 | 1.80 |

According to this example, 772.02 g of deionized water, 14.40 g Brij 35L, and 143.64 g Biosoft S-100 were added to a glass resin kettle. The kettle was heated to 85° C. with stirring at 465 RPM. When the temperature had reached 85° C., the first feed portion of the cyclic siloxane was commenced. Ten minutes later, feeding of a silane/cyclic siloxane pre-mix was commenced. All of the cyclic siloxane was fed over a period of one hour. The reaction temperature was maintained at 85° C. for six hours from the start of the initial feed of cyclic siloxane. After six hours at 85° C., 62.28 g of Brij 35 L was added. The reaction was cooled to 12° C. with an ice bath, and maintained at 12° C. for three hours. After three hours at 12° C., 87.66 g of triethanolamine and 267.48 g of dilution water were added, and allowed to mix for thirty minutes. Kathon CG was then added.

An emulsion was produced containing a polymer with a particle size of 33 nm as determined on a Microtrac Ultrafine Particle Size Analyzer. Its internal phase polymer viscosity was 2,000,000 centipoise (mPa·s) as determined on the Carrimed cone and plate rheometer at 100 dynes/cm2. The polymer extracted from this emulsion was tacky to the touch and had no elastomeric integrity.

Example 2
Modified Emulsion Procedure—Comparative Example

Example 1 was repeated except that 0.15% of the MTM silane was used. This modification produced the highest polymer viscosity. The emulsion contained a polymer with a particle size of 31 nm as determined on the Microtrac Ultrafine Particle Size Analyzer. Its internal phase polymer viscosity was 83,000,000 centipoise (mPa·s) as determined on the Carrimed cone and plate rheometer at 100 dynes/cm$^2$. The Elastic Modulus G' was 3780 pascal (Pa), and the Viscous Modulus G" was 2542 pascal (Pa). The polymer extracted from this emulsion was tacky to the touch and had very little elastomeric integrity.

Example 3
Emulsion Procedure—The Present Invention

The following formulation was used to make an 1800 gram batch of an emulsion utilizing the new method of silane incorporation according to the present invention. Thus, instead of pre-feeding the cyclic siloxane, adding a mixture of MTM silane with another small amount of cyclic siloxane, and feeding the components over a set time frame, as in the methods in Examples 1 and 2; the MTM silane in this example was added directly to a hot surfactant, water, acid mixture in the kettle.

This method produced an emulsion containing a polymer with a viscosity of 200,000,000 centipoise (mPa·s) when the reaction was carried out at 85° C. It is believed that the reason this procedure produces a polymer with such a higher viscosity is because the hydrolyzed silane is stabilized by the surfactant micelles, and as a result, any silane-silane interactions are inhibited. The hydrolyzed silane monomer is then free to react with the polydimethylsiloxane monomer to form a more random crosslinked network. This produces a polymer with unique rheological properties compared to prior art techniques, as well as a more elastomeric polymer, as can be seen in Table I.

| Material | Percent | Weight (gram) |
| --- | --- | --- |
| DI Water | 42.89 | 772.02 |
| Brij 35L | 0.80 | 14.40 |
| Biosoft S-100 | 7.98 | 143.64 |
| MTM | 0.15 | 2.70 |
| D$_4$ | 24.85 | 447.30 |
| Brij 35L | 3.46 | 62.28 |
| TEA | 4.87 | 87.66 |
| DI Water | 14.86 | 267.48 |
| Kathon CG | 0.10 | 1.80 |

According to this example, 772.02 g deionized water, 14.40 g Brij 35L, and 143.64 g Biosoft S-100 were added to a glass resin kettle. The kettle was heated to 85° C. with stirring using a setting of 465 RPM. When the temperature had reached 85° C., the MTM silane was added manually through a port in the resin kettle using a plastic pipette. It was allowed to disperse for five minutes. Feeding of the cyclic siloxane was commenced and completed in about one hour. The reaction was maintained at 85° C. for six hours, measured from the start of the feeding of the cyclic siloxane. After six hours at 85° C., 62.28 g of Brij 35 L was added. The reaction was cooled to 12° C. with an ice bath, and maintained at 12° C. for three hours. After three hours at 12° C., 87.66 g of TEA and 267.48 g of dilution water were added and allowed to mix for thirty minutes. Kathon CG was then added.

The resulting emulsion contained a polymer with a particle size of 45 nm as determined on a Microtrac Ultrafine Particle Size Analyzer. The internal phase polymer viscosity was 200,000,000 centipoise (mPa·s) as determined on a Carrimed cone and plate rheometer at 100 dynes/cm². The Elastic Modulus G' of the polymer was 4622 Pa, and its Viscous Modulus G" was 2866 Pa. The polymer extracted from the emulsion was slightly tacky to the touch, although no tack was transferred. It had a slightly elastomeric quality.

primary reaction temperature from 85° C. to 95° C. yielded a slightly larger particle size, and the increase in particle size is believed to be responsible for the higher viscosity of the polymer over that obtained in Example 3.

The emulsion prepared in this example contained a polymer with a particle size of 58 nm as determined on the Microtrac Ultrafine Particle Size Analyzer. Its internal phase polymer viscosity was 800,000,000 centipoise (mPa·s) as determined on the Carrimed cone and plate rheometer at 100 dynes/cm². The Elastic Modulus G' of the polymer was 8198 Pa, and its Viscous Modulus G" was 3956 Pa. The polymer extracted from this emulsion was slightly tacky to the touch. It could be removed from a container and had strong elastic properties. It left no residue on the fingers indicating a non-transferable tack.

The results from Examples 2–5 are summarized in Table I. In Table I, the elastic modulus G', the viscous modulus G", and the dissipation factor tan 6 (G"/G'), were measured using the Oscillation Procedure described above. The low shear Internal Phase Polymer Viscosity cP (mPa·s) was measured at 100 dynes/cm² using the Flow Procedure also described above.

TABLE I

Experimental Data

| | | | Intensity | | Polymer Rheology | | | |
|---|---|---|---|---|---|---|---|---|
| Example | Temp. ° C. | Silane Addition | Particle Size, nm | Internal Phase Polymer Viscosity, cP (mPa · s) | G', Pa | G", Pa | Tan δ G"/G' | Sensory Properties |
| 2 | 85 | Fed with D4 | 38 | 83,000,000 | 3780 | 2542 | 0.6725 | Tacky Elastic Gel, little elastomeric integrity |
| 3 | 85 | Direct | 39 | 200,000,000 | 4622 | 2866 | 0.6201 | Slightly tacky solid, elastic, stringy |
| 4 | 90 | Direct | 45 | 400,000,000 | 6500 | 3424 | 0.5268 | Slightly tacky solid, highly elastic |
| 5 | 95 | Direct | 54 | 800,000,000 | 8198 | 3956 | 0.4825 | Slightly tacky solid, high elastomeric integrity |

Example 4
Emulsion Procedure—The Present Invention

Example 3 was repeated, except that a higher reaction temperature was employed, i.e. 90° C. This technique provided an emulsion containing a polymer with a viscosity of 400,000,000 centipoise (mPa·s). Raising the primary reaction temperature from 85° C. to 90° C. yielded a slightly larger particle size, and it is believed that the increase in particle size was responsible for the higher viscosity of the polymer over that obtained in Example 3.

The emulsion prepared in this example contained a polymer with a particle size of 52 nm as determined on the Microtrac Ultrafine Particle Size Analyzer. Its internal phase polymer viscosity was 400,000,000 centipoise (mPa·s) as determined on the Carrimed cone and plate rheometer at 100 dynes/cm². The Elastic Modulus G' of the polymer was 6500 Pa, and its Viscous Modulus G" was 3424 Pa. The polymer extracted from this emulsion was slightly tacky. It could be removed from a container and stretched without breaking or "stringing". It left no sticky residue on the fingers indicating its non-transferable tack.

Example 5
Emulsion Procedure—The Present Invention

Example 3 was again repeated, except that a higher reaction temperature was employed, i.e. 95° C. This technique provided an emulsion containing a polymer with a viscosity of 800,000,000 centipoise (mPa·s). Raising the Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of preparing an emulsion containing particles of an organopolysiloxane with an average particle diameter of less than about 100 nanometer, comprising: (i) adding a polyfunctional silane to an aqueous medium containing a nonionic surfactant, an anionic or cationic surfactant, and a catalyst; (ii) allowing the polyfunctional silane to hydrolyze; (iii) adding a cyclic siloxane to the aqueous medium containing the pre-hydrolyzed polyfunctional silane; (iv) copolymerizing the cyclic siloxane and the pre-hydrolyzed polyfunctional silane to form the organopolysiloxane; and (v) continuing copolymerizing step (iv) until the resulting organopolysiloxane has a viscosity greater than about 100,000,000 centipoise (mPa·s).

2. A method according to claim 1 in which the polyfunctional silane is a water-soluble hydrolyzable or a partially pre-hydrolyzed trialkoxysilane or tetraalkoxysilane.

3. A method according to claim 2 in which the polyfunctional silane is selected from the group consisting of methyltrimethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, phenyltrimethoxysilane, tetramethoxysilane, tetraethoxysilane, tetrapropoxysilane, and tetrabutoxysilane.

4. A method according to claim 1 in which the cyclic siloxane is an oligomer of the formula $(R_2SiO)_x$ where R is a saturated alkyl group of 1–6 carbon atoms, an unsaturated alkyl group of 1–6 carbon atoms, or an aryl group of 6–10 carbon atoms, and x is 3–7.

5. A method according to claim 4 in which the siloxane oligomer is selected from the group consisting of hexamethylcyclotrisiloxane, octamethylcyclotetrasiloxane, decamethylcyclopentasiloxane, tetramethyltetravinylcyclotetrasiloxane, tetramethyltetraphenylcyclotetrasiloxane, and mixtures thereof.

6. A method according to claim 1 in which the emulsion is prepared at a temperature in the range of 50 to about 95° C.

* * * * *